US011551217B2

(12) United States Patent
Day (10) Patent No.: US 11,551,217 B2
(45) Date of Patent: Jan. 10, 2023

(54) MULTI-TOUCH KEY ENTRY INTERFACE (71) Applicant: NCR Corporation, Atlanta, GA (US)

(72) Inventor: Phil Noel Day, Fife (GB)

(73) Assignee: NCR Corporation, Atlanta, GA (US)

(*) Notice: Subject to any disclaimer, the term of this patent is extended or adjusted under 35 U.S.C. 154(b) by 323 days.

(21) Appl. No.: 17/023,659

(22) Filed: Sep. 17, 2020

(65) Prior Publication Data

US 2022/0084029 A1 Mar. 17, 2022

(51) Int. Cl.
G06Q 20/00 (2012.01)
G06Q 20/40 (2012.01)
G06F 21/83 (2013.01)
G07F 19/00 (2006.01)

(52) U.S. Cl.
CPC ......... *G06Q 20/4012* (2013.01); *G06F 21/83* (2013.01); *G07F 19/201* (2013.01)

(58) Field of Classification Search
CPC .... G06Q 20/4012; G06F 21/83; G07F 19/201
See application file for complete search history.

(56) References Cited

U.S. PATENT DOCUMENTS

2005/0162402 A1* 7/2005 Watanachote ........ G06F 3/0416
345/173

* cited by examiner

*Primary Examiner* — Jamara A Franklin
(74) *Attorney, Agent, or Firm* — Schwegman, Lundberg & Woessner (57) ABSTRACT An initial multi-digit contact (multi-touch) is detected on a surface of a touchscreen display during initiation of a key entry session on a transaction terminal. A reference row for a logically maintained keypad is set for the key entry session based on the multi-touch. Active rows for the key entry session are changed by swipes up or down. A given key within an active row is selected based on pressure applied by or removed from one of the digits relative to other digits in the multi-touch or based on one of the digits swiped up or down while other digits remain stationary. The key entry session terminates when the multi-digit contact is lifted off the surface without further touching for a preconfigured period of elapsed time. In an embodiment, the session terminates when a multi-touch swipe to the left and then the right is detected (or right and then left).

20 Claims, 7 Drawing Sheets

FIG. 1A

KEYS

○ TOUCH

□ DIRECTION CHANGE

▲ END OF TOUCH - LIFT OFF TOUCH

● TOUCH WITH PRESSURE CHANGE DETECTED

PIN ACTIVATION

| 1 | 2 | 3 |
| --- | --- | --- |
| 4 | 5 | 6 |
| 7 | 8 | 9 |
| * | 0 | # |

TRANSLATED

MOVE UP 1 ROW FROM A CURRENT ACTIVATION ROW

| 1 | 2 | 3 |
| --- | --- | --- |
| 4 | 5 | 6 |
| 7 | 8 | 9 |
| * | 0 | # |

TRANSLATED

MOVE DOWN 1 ROW FROM A CURRENT ACTIVATION ROW

| 1 | 2 | 3 |
| --- | --- | --- |
| 4 | 5 | 6 |
| 7 | 8 | 9 |
| * | 0 | # |

TRANSLATED

SINGLE DIGIT SELECTION OF A 9
KEY FROM A CURRENT ACTIVE
ROW OF 789

FIG. 1E

RESET, CLEAR, AND/OR CANCEL PIN
ENTRY

FIG. 1F

DELETE LAST-ENTERED KEY ENTRY
FOR PIN

FIG. 1G

PROPRIOCEPTION NON-DOMINANT
STABILIZING TOUCH DURING PIN
ENTRY – MULTIPLE EXTREMITY
TOUCHES DURING PIN ENTRY

MULTI-TOUCH KEY ENTRY INTERFACE

BACKGROUND

Increasingly traditional keypads are being removed from electronic devices and terminals. Input from users is being driven by touchscreen displays, which have been miniaturized and are integrated into even the smallest of devices, such as smart watches. Elimination of keypads/keyboards removes the number of electromechanical and software components needed for producing and maintaining the devices/terminals.

However, Automated Teller Machines (ATMs) are one type of device where Personal Identification Number (PIN) keypads still have a substantial presence in the industry; this is for a variety of reasons.

First, ATMs are secure devices that allow consumers to withdraw currency while performing withdrawal transactions. Software that operates on the ATMs is often the target of thieves for obvious reasons. Thus, it is crucial that the ATM maintain a secure mechanism by which a user can securely enter a PIN for access to a user's account. Typically, an ATM PIN pad is referred to as an encrypted PIN pad that includes its own independent processor from the ATM's core processor. When a user enters a PIN, the ATM core processor cannot detect which keys are depressed for a PIN entry; rather, the processor of the encrypted PIN pad receives the PIN and encrypts the PIN with a transaction-specific hash. The encrypted PIN is forwarded from the processor of the encrypted PIN pad to the ATM core processor and the encrypted PIN is sent from the ATM to a servicing financial institution that verifies the encrypted PIN and provides back a validation to the ATM core processor. As a result, the encrypted PIN pad provides a secure mechanism by which PINs are received and processed by an ATM.

Second, ATMs are subject to a variety of governmental/agency laws and regulations. One important regulation in the United States is the American's Disability Act (ADA), which mandates that the ATM provide a mechanism by which sight- and hearing-impaired individuals can conduct transactions on the ATM. The encrypted PIN pad typically includes raised tactile features on the surfaces of the keys, which can be felt by a sight-impaired individual for purposes of entering a user PIN. The ATMs also include a headphone jack for use with headphones to provide audio feedback to the sight-impaired individual during a transaction.

PIN entry at ATMs is difficult for sight-impaired individuals because auditory feedback can be prohibited by regulations associated with security of PIN entry. As a result, sight-impaired individuals often encounter more PIN entry errors and mistakes then do individuals without any sight impairments because there is no key-entry feedback provided during PIN entry.

Thus, removal of the encrypted PIN pads has remained an elusive goal that faces many technological hurdles (security based, compliance based, and error-rate based).

SUMMARY

In various embodiments, methods and a terminal for processing a multi-touch key entry interface are presented.

According to an embodiment, a method for processing a multi-touch key entry interface is presented. For example, a first multi-touch is identified on a surface of a touchscreen after initiation of a key entry session on a terminal. An active reference row that maps to a logically maintained keypad is set for the key entry session based on the identifying. The logically maintained keypad is navigated from the active reference row and key entries corresponding to the logically maintained keypad are selected based on second multi-touches on the surface of the touchscreen. The key entries are provided as a result for the key entry session when the key entry session terminates.

DETAILED DESCRIPTION

Figure 1A:
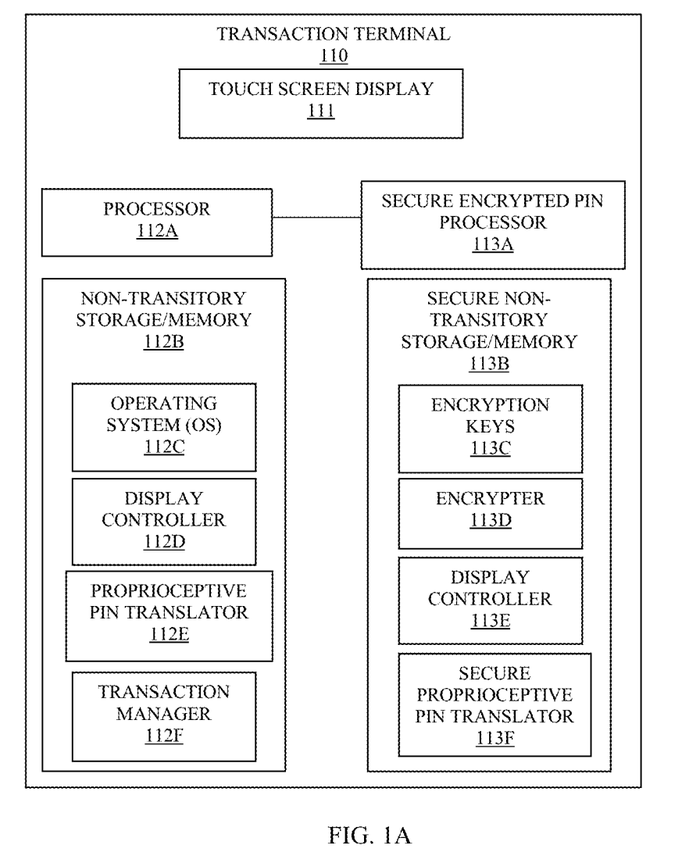
FIG. 1A is a diagram of a terminal for processing a multi-touch key entry interface on a touch display, according to an example embodiment.

FIG. 1A is a diagram of a terminal 110 for processing a multi-touch key entry interface on a touch display, according to an example embodiment. It is to be noted that the components are shown schematically in greatly simplified form, with only those components relevant to understanding of the embodiments being illustrated.

Furthermore, the various components (that are identified in the FIG. 1A) are illustrated and the arrangement of the components is presented for purposes of illustration only. It is to be noted that other arrangements with more or fewer components are possible without departing from the teachings of processing a multi-touch key entry interface on a touch display presented herein and below.

As will be more completely discussed herein and below, the teachings provide a multi-touch interface rendered on a touchscreen that permits multiple touches to be made simultaneously on a surface of the touchscreen for purposes of providing input keys to another service (such as a transaction service, an authentication service, and ATM core application during PIN entry, etc.). The location on the surface of the touchscreen that receives a multi-touch from a user at the start of each key entry session is irrelevant, each such initial multi-touch is assumed to begin at a reference row on a logically maintained keypad. Each key entry session is terminated when the user releases multi-digit contact from the surface of the touchscreen (e.g., lifts three finger off the surface to break contact with the surface without any subsequent multi-digit contact with the surface for a preconfigured period of elapsed time). Each key selected/entered during the key entry session is determined based on the number and types of movements made in a vertical and/or horizontal direction through the multi-digit touches and based on pressure applied by one digit relative to other digits that remain in contact with the surface of the touchscreen during the key entry session (or a change in direction of one digit relative to remaining digits of a given multi-digit touch).

As will be demonstrated more completely herein and below the multi-touches of a user during a key entry session on a transaction terminal is particular useful to sight-impaired individuals to more easily operate the transaction terminal during key entry by using a mental mapping of a known keypad layout or known selection menu layout that includes the reference row and that row's position relative to other rows of the keypad or known selection menu. The user is also able to identify a particular key for selection based on a known order and placement of keys within a given active row of the keypad. The sight-impaired individual requires little to no training to fully interact with the multi-touch interface because users are already familiar with the known keypad layout or the known selection menu.

A "multi-touch" refers to more than 1 simultaneous touch by multiple digits of a user on a surface of a touchscreen display.

In an embodiment, the multi-touch comprises three digits or three knuckles of a user simultaneously touching the surface of the touchscreen display. In an embodiment, the three digits can be any combination of a thumb, an index finger, a middle finger, a ring finger, and a pinky (little) finger.

In an embodiment, the multi-touch is determined to be present when a key entry session is activated during a transaction on a transaction terminal based on an initial touch to the surface of the touchscreen display made by the user; however the actual initial touch may be made by the user's stump, fist, knuckles, or a single extremity. This comprises a single contact touch made by the user but having a wider area of coverage on the surface than would a single user digit. Pressure differences applied by the user to different areas of the fist, stump, knuckles, or extremity are used to identify key selections during the key entry session and characteristics of the multi-touch.

A "key entry session" is identified based on a processing state of a transaction being processed on a transaction terminal. The processing state expects to receive keys, or a PIN provided by the user for authentication of an operation during the transaction. The keys or PIN entry are expected to be provided through a PIN pad operated by a user during the transaction.

Transaction terminal 110 comprises a touchscreen display 111, a processor 112A and non-transitory storage/memory 1128. Non-transitory storage/memory 112B comprises executable instructions for an operating system (OS) 112C, a display controller 112D (optional), a proprioceptive PIN translator 112E (optional), and a transaction manager.

Transaction terminal 110 further comprises a secure encrypted PIN processor 113A and secure non-transitory storage/memory 113B. Secure non-transitory storage/ memory 1138 comprises encryption keys 113C and executable instructions for an encrypter 113D, a display controller 113E, and a secure proprioceptive PIN translator 113F.

Processor 112A loads executable instructions associated with OS 112C, display controller 112D (optional), proprioceptive PIN translator 113E (optional), and transaction manager 112F from storage/memory 1128. This causes processor 112A to establish a first processing environment or processing context.

Processor 113A loads executable instructions associated with encrypter 113, display controller 113E, and secure proprioceptive PIN translator 113F from storage/memory 1138. This causes processor 113A to establish a secure processing environment of a secure processing context.

Applications or operations being processed within the first processing environment do not have access to the secure processing environment. The first processing environment and the secure processing environment are separate from one another.

During a transaction being processed on terminal 110, the transaction manager 112F raises an event indicating that a secure PIN is required to be entered to continue with the transaction on terminal 110. This causes processor 112A to send a message to secure processor 113A requesting a PIN value. Secure processor 113A then takes processing control over the touchscreen display 111, this prevents the transaction processor 112A from being able to access or read any display buffers associated with the touchscreen display 111. In this way, a user can enter a PIN using an encrypted and secure mechanism on the same touchscreen display 111 that was being used to conduct the transaction and any software that may have been corrupted on terminal 110 within the first processing environment is unable to decipher the actual PIN entry that is being entered through touchscreen display 111 while secure processor 113A has operating control over display 111.

When secure processor 113A takes control of display 111 based on the detected event provided from processor 112A (raised by transaction manager 112F during the transaction), secure proprioceptive PIN translator 113F is activated and interacts with display controller 113E and encrypter 113D during a key entry session.

Conventionally, a physical PIN pad with raised tactile features (that may be Braille, dots, or other abstract shapes) would be used by the user to enter a PIN during PIN entry or a software-rendered PIN pad would be presented on a display to the user for entry of a PIN. Neither of these two scenarios are present with the embodiments presented herein. That is, there is no activation of any physical PIN pad associated with terminal 110 and there is no rendering of any PIN pad on the display 111 herein; rather, the screen information displayed on display may remain unchanged from what it was before the key entry session was initiated or the screen may be blacked out entirely on display 111 during the key entry session, such that displayed or non-displayed information on display 111 during the key entry session is irrelevant to and is not-dependent on key entries or PIN entry during the key entry session.

Display controller 113E provides touch characteristics and touch location information during the key entry session to secure proprioceptive PIN translator 113F. At the start of the key entry session, secure proprioceptive PIN translator 113F receives initial touch characteristics for a multi-touch made by the user onto the surface of display 111 (such as current pressures and locations detected for three simultaneous digit touches on the surface). This initial multi-touch is translated by secure proprioceptive PIN translator 113F into setting an active row for a logically maintained PIN pad to be row 456 (middle row located below row 123 and above row 789).

The user changes the active row by swiping the multi-touch up for activating row 123 and down for activating row 789 from the initially set and active row of 456. Any active row is changed in the same manner. So, if an active row is 123, the user can reach row *0 # by swiping the multi-touch down three times, the first swipe down changes the active row from 123 to 456, the second swipe down changes the active row from 456 to 789, and finally the third swipe down changes the active row from 789 to *0 #.

A key selection within any active row is made by the user applying more pressure to the digit (relative to the other two digits) in the multi-touch that corresponds to a given key for the active row which the use desires to select. For example, if the multi-touch comprises the user's index finger, middle finger, and ring finger and the active row is 456, the user can select the 5 key by applying more downward pressure onto the surface of display 111 with the user's middle finger while the pressure of the index finger and ring finger remains relatively unchanged (less of a change in pressure with the index and ring fingers than what is detected for the ring finger). Optionally, key selection within a given active row may be achieved by selectively swiping the digit that corresponds to the desired key up or down while maintaining the remaining two digits relatively stationary (some movement in the other two digits may occur but the magnitude in the movement change of the swiped digit will exceed the magnitude of any movement detected in the two remaining stationary digits).

Figure 1B:
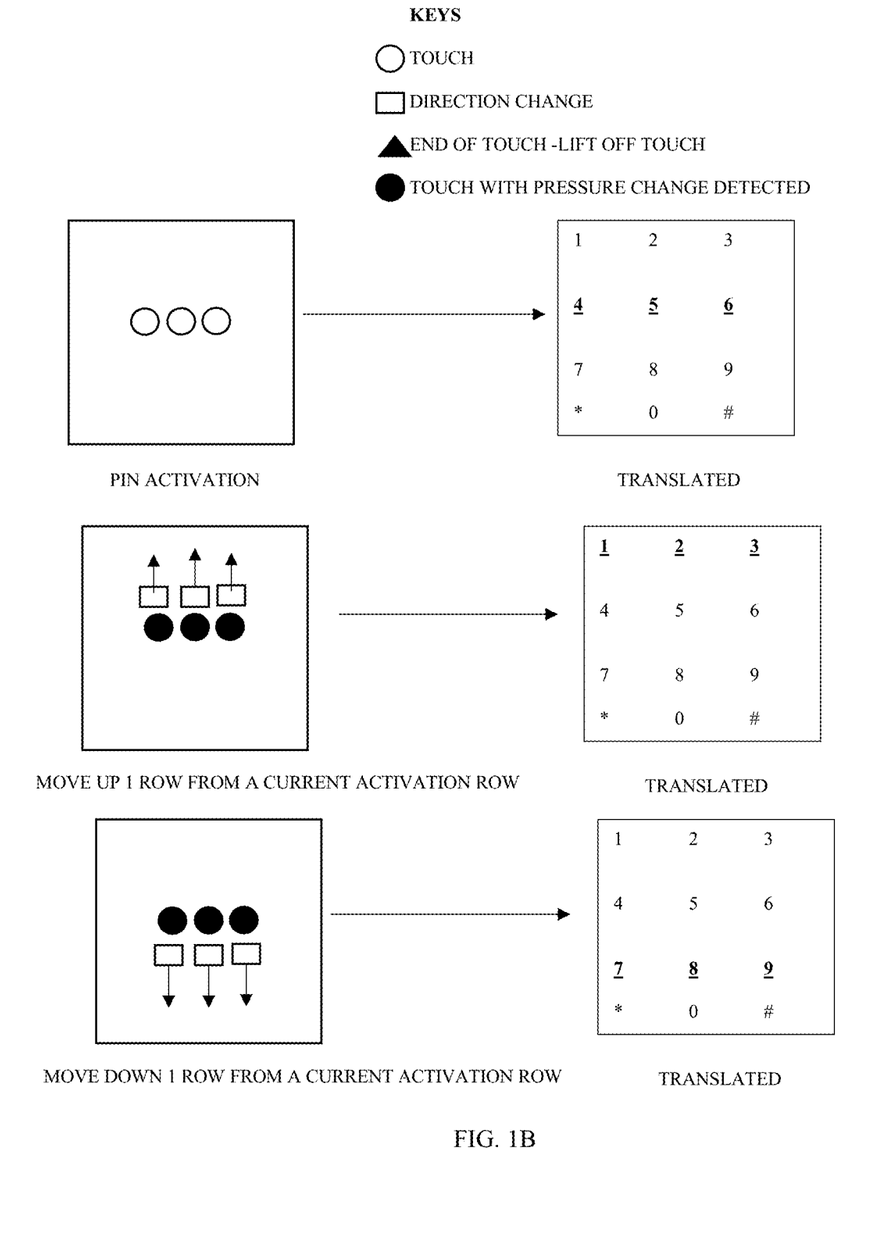
FIG. 1B is a diagram of example multi-touches and corresponding key translations for initially activating a row on a keypad and changes rows up and down on the keypad, according to an example embodiment.

FIG. 1B is a diagram of example multi-touches and corresponding key translations for initially activating a row on a keypad and changes rows up and down on the keypad, according to an example embodiment.

FIG. 1B illustrates an initial multi-touch provided by a user when a key entry session is initiated, and multi-touches made by the user that change the active row. The corresponding touch characteristics (touch locations, pressures, change in direction, magnitude of change in direction, etc.) are reported by display controller 113E to secure proprioceptive PIN translator 113F. The arrows in FIG. 1B show the result of secure proprioceptive PIN translator 113F translating the touch characteristics into an active row of a logically maintained keypad (the active rows are bolded and underlined in FIG. 1B).

A change in the active row is detected as touch characteristics where pressure to the digits are applied to the surface of the display 111 and swiped up or down (changing direction). The two changes associated with changing the active row both assuming that such multi-touches were made when the active row was row 456 (the initially set active row for the key entry session).

Figure 1C:
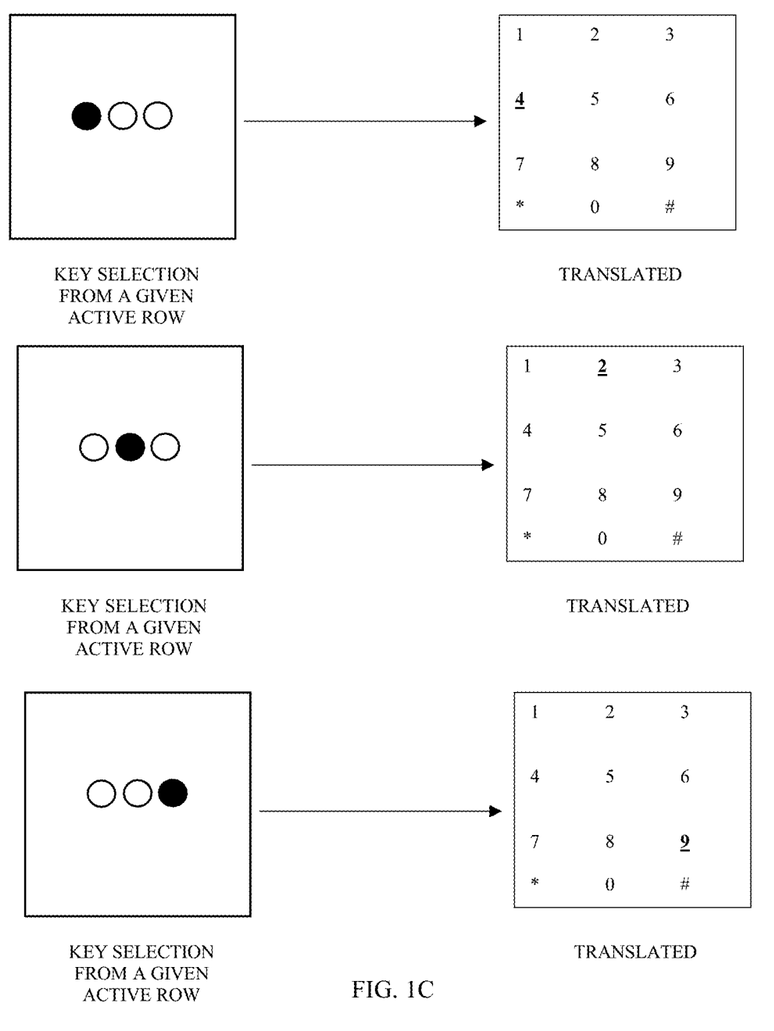
FIG. 1C is a diagram of example key selections from a given active row of the keypad, according to an example embodiment.

FIG. 1C is a diagram of example key selections from a given active row of the keypad, according to an example embodiment.

A user applying pressure to a first digit (such as index finger) relative to the two remaining digits (such as middle finger and ring finger) causes the 4 key to be selected when the current active row is 456. When the active row is changed to row 123 and the user applies more pressure to a middle digit (such as middle finger) relative to the two remaining digits (such as index finger and ring finger), the 2 key is selected. When the active row is set to row 789 and the user applies more pressure to the third digit (such as ring finger) relative to the two remaining digits (such as index finger and middle finger), the 9 key is selected.

Figure 1D:
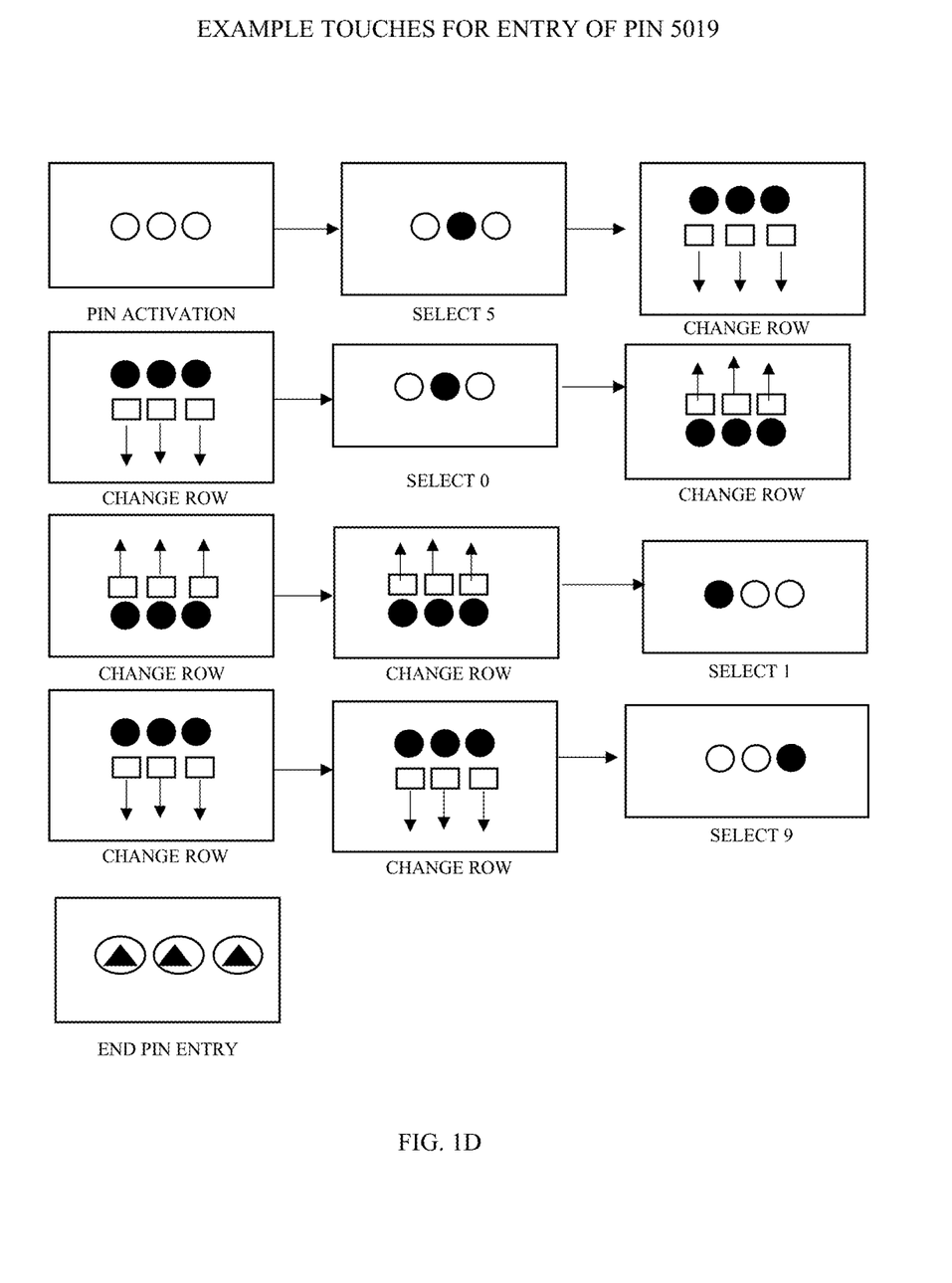
FIG. 1D is a diagram illustrating multi-touches on a keypad for entering a Personal Identification Number (PIN) corresponding to an example PIN of 5019, according to an example embodiment.

FIG. 1D is a diagram illustrating multi-touches on a keypad for entering a PIN corresponding to an example PIN of 5019, according to an example embodiment.

FIG. 1D illustrates and entire example key entry session during which a user enters a PIN having a value of 5019. The session begins with the initial multi-touch during which the active row is set to row 456. The user applies more pressure to the middle digit in the multi-touch causing secure proprioceptive PIN translator 113F to identify entry of the 5 key. The user then applies pressure and swipes the multi-touch down twice which changes the active row from row 456 to row 789 and from row 789 to row *0 #. Again, the user applies more pressure to the middle digit in the multi-touch causing secure proprioceptive PIN translator 113F to identify entry of the 0 key (at this point the user has entered "50" of the PIN "5019"). Next, the user applies pressure and swipes up three times which changes the active row from row *0 # to row 789, from row 789 to row 456, and from row 456 to row 123. The user applies more pressure to the first digit (such as index finger) in the multi-touch causing secure proprioceptive PIN translator 113F to identify entry of the 1 key (at this point the user has entered "501" of the PIN "5019"). Finally, the user changes the active row 123 to row 789 by swiping down twice from row 123 to row 456 and from row 456 to row 789, and the user applies more pressure to the last digit (such as ring finger) causing secure proprioceptive PIN translator 113F to identify entry of the 9 key (the full PIN value of "5019" is now entered).

The user then removes the digits from the surface of the display 111, which causes secure proprioceptive PIN translator 113F to determine that PIN entry has concluded (after a predetermined period of elapsed time during which secure proprioceptive PIN translator 113F receives no additional touch characteristics for any touches from display controller 113E.

PIN value 5019 is passed from secure proprioceptive PIN translator 113F to encrypter 113D. Encrypter 113D uses encrypting keys 113C to encrypt and/or produce a hash value for PIN value 5019. The encrypted PIN value or encrypted hash value is passed from secure processor 113A to processor 112A and obtained by transaction manager 112F within the first processing environment. Secure processor 113A relinquishes control over display 111 back to processor 112A. Transaction manager 112F passes the encrypted PIN/hash to an authenticator (such as a financial service over a network connection/switch) along with transaction information and receives back authorization or a denial. Transaction manager 112F processes the transaction based on the authorization or the denial.

Figure 1E:
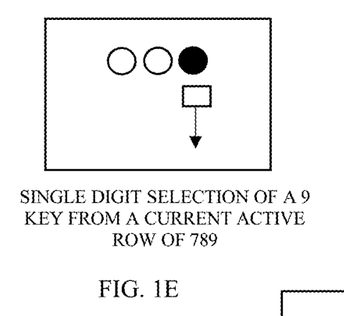
FIG. 1E is a diagram illustrating another key selection touch for selecting a given key from a given active row of the keypad, according to an example embodiment.

FIG. 1E is a diagram illustrating another key selection touch for selecting a given key from a given active row of the keypad, according to an example embodiment.

FIG. 1E shows an alternative multi-touch mechanism by with secure proprioceptive PIN translator 113F identifies a user-selected or entered key from an active row. A user can apply pressure and swipe up or down with one of the digits of the multiple digits to select a corresponding key for entry from the currently active row. For example, FIG. 1E shows an active row of 789 for which the user swipes down (could also have been up) with the last digit (such as ring finger) to select the 9 key.

Figure 1F:
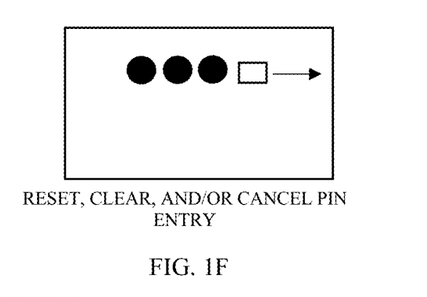
FIG. 1F is a diagram illustrating a multi-touch swipe to the right for resetting, clearing, and/or canceling a current PIN entry on the keypad, according to an example embodiment.

FIG. 1F is a diagram illustrating a multi-touch swipe to the right for resetting, clearing, and/or canceling a current PIN entry on the keypad, according to an example embodiment.

When the user swipes to the right (not up or down) with pressure applied to the multi-touch, secure proprioceptive PIN translator 113F translates such multi-touch into a reset, clear, and/or cancel PIN entry command. This allows the user to restart PIN entry in case the user believes that an error in key entry occurred.

Figure 1G:
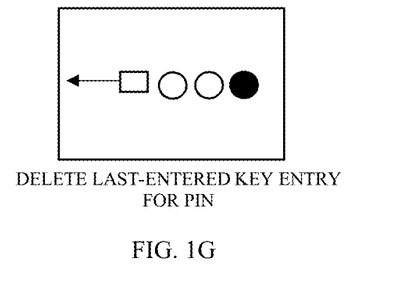
FIG. 1G is a diagram illustrating a multi-touch swipe to the left for deleting or clearing a last-entered key for a given PIN on the keypad, according to an example embodiment.

FIG. 1G is a diagram illustrating a multi-touch swipe to the left for deleting or clearing a last-entered key for a given PIN on the keypad, according to an example embodiment.

When the user swipes to the left (not up or down) with pressure applied to the multi-touch, secure proprioceptive PIN translator 113F translates such multi-touch into a delete the last-entered or last record key in the PIN command. This allows the user to delete or remove the last-entered key of the PIN in case the user believes that an error in last key entry occurred by the user.

It is noted that a clear PIN entry could be a swipe to the left instead of the right with the delete last key entered a swipe to the right or vice versa as illustrated in FIGS. 1F and 1G.

Figure 1H:
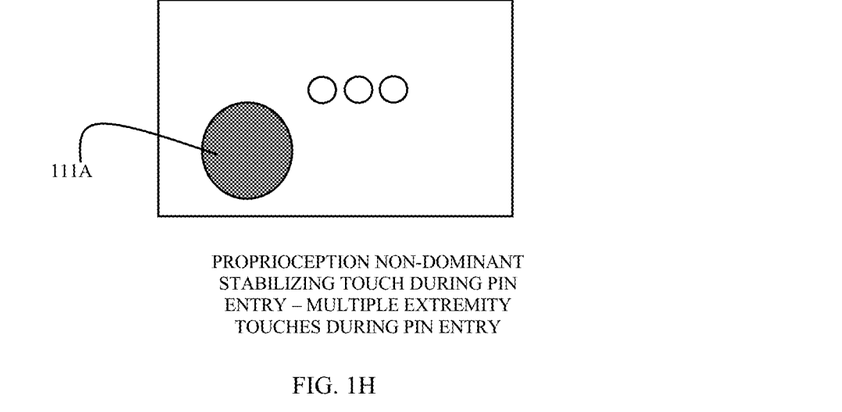
FIG. 1H is a diagram illustrating a proprioception non-dominant hand stabilizing touch combined with a dominant hand multi-touch during PIN entry on the keypad, according to an example embodiment.

FIG. 1H is a diagram illustrating a proprioception non-dominant hand stabilizing touch combined with a dominant hand multi-touch during PIN entry on the keypad, according to an example embodiment.

FIG. 1H illustrated another feature of the multi-touch interface where a user can place a non-dominate hand 111A, extremity, or stump on the surface of the display 111 as a stabilizing force and/or as a reference point. The user then uses the dominate hand digits, stump, or extremity to set the initial row for the keypad during the key entry session.

Here, the location of the non-dominant hand 111A serves as a bottom left/right corner of the keypad and the user places the dominant hand relative to the non-dominant hand's placement. This allows the user to visualize mentally the layout of the keypad with the non-dominant hand's placement serving as a bottom corner of the keypad. This also gives the user distance and space awareness when making the multi-touches during the key entry session.

In an embodiment, the non-dominant hand 111A is denoted as being a last row *0 # of the keypad and serves as an anchor location for reference by the user during the key entry session.

As mentioned above, in some embodiments the user may have a handicap that prevents usage of three digits, In such cases, a closed first or a stump of the user is used as the multi-touch and the pressure relative to the length and width of the touch determines key selection of the user.

In an embodiment, the initial active row can be set to row 123 or row *0 # based on a configuration parameter to the secure proprioceptive PIN translator 113F. In some cases, the configuration parameter is customized based on a user identifier for the user conducting the transaction, which may be obtained from the user through a card read at the terminal 110 at the start of the transaction.

In an embodiment, haptics are provided when a user is determined to have made a key entry. This can be a vibration or pulse of the screen for the display 111, which is tactile detectable by the user, or this can be a beep in cases where the user is using a headset for the transaction at terminal 110 (without audibly identifying any entered number, which may pose a security threat with any eavesdroppers to the transaction). The haptics can be provided when active rows are changed, such as a single pulse for changing an active row to rows 123, 789, and *0 # but a double pulse for when the active row is changed to row 456 (center-reference row for the keypad).

In an embodiment, key selection is detected for a currently active row by lifting a digit corresponding to a key in the active row; rather than by applying pressure or swiping the digit.

In an embodiment, a key entry session is terminated, and key entry is considered concluded when the multi-touch is swiped to the right and then the left or vice versa.

During the key entry session, there is no audible or visual information communicated from terminal 110 as to what PIN values are being entered, which provides increased security for PIN entry at terminal 110.

In an embodiment, terminal 110 is an ATM, a Point-Of-Sale (POS) terminal, or a Self-Service Terminal (SST).

In an embodiment, the multi-touch key entry interface is implemented with display controller 112D and proprioceptive PIN translator 112E. In this embodiment, non secure key entries can be processed in the manners discussed above with display controller 113E and secure proprioceptive PIN translator 113F utilizing display controller 112D and proprioceptive PIN translator 112E within the first processing environment, such that only secure key entries activate secure encrypted PIN processor 113A and the secure processing environment.

These and other embodiments, are now discussed with reference to the FIGS. 2-4.

Figure 2:
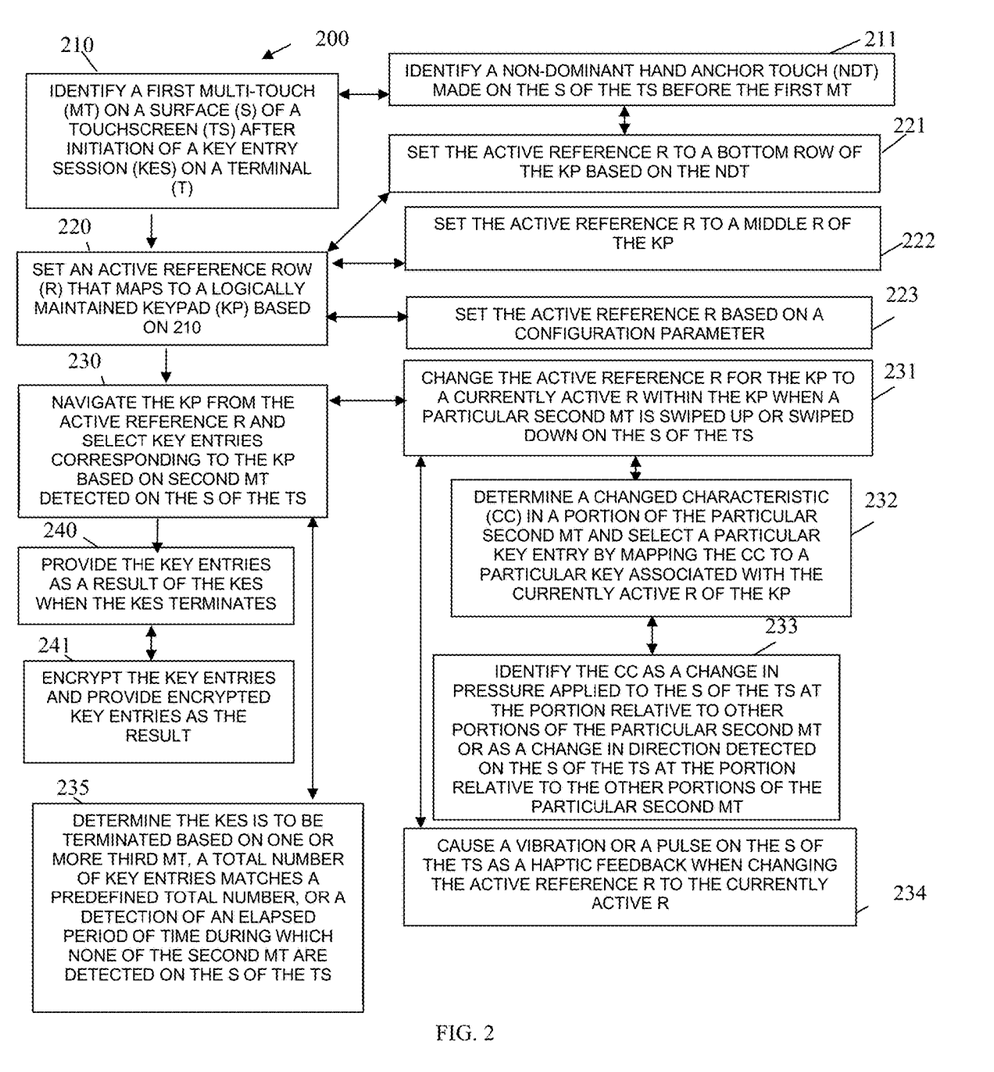
FIG. 2 is a diagram of a method for processing a multi-touch key entry interface, according to an example embodiment.

FIG. 2 is a diagram of a method 200 for processing a multi-touch key entry interface, according to an example embodiment. The software module(s) that implements the method 200 is referred to as a "secure key entry interface manager." The secure key entry interface manager is implemented as executable instructions programmed and residing within memory and/or a non-transitory computer-readable (processor-readable) storage medium and executed by one or more processors of a device. The processor(s) of the device that executes the secure key entry interface manager are specifically configured and programmed to process the secure key entry interface manager. The secure key entry interface manager may have access to one or more network connections during its processing. The network connections can be wired, wireless, or a combination of wired and wireless.

In an embodiment, the device that executes the secure key entry interface manager is transaction terminal 110. In an embodiment, the transaction terminal 110 is one of: an SST, a POS terminal, an ATM, and/or a kiosk:

In an embodiment, the device that executes the secure key entry interface manager is one of: a tablet, a phone, a laptop, a desktop, and a wearable processing.

In an embodiment, the secure key entry interface manager is all or some combination of display controller 112D, proprioceptive PIN translator 112E, display controller 113E, and/or secure proprioceptive PIN translator 113F.

At 210, the secure key entry interface manager identifies a first multi-touch on a surface of a touchscreen after initiation of a key entry session on a terminal.

In an embodiment, at 211, the secure key entry interface manager identifies a non-dominant hand anchor touch 111A made on the surface of the touchscreen before detection of the first multi-touch at 210. This was discussed above with reference to FIG. 1H.

At 220, the secure key entry interface manager sets an active reference row that maps to a logically maintained keypad based on detection of the first multi-touch at 210.

In an embodiment of 211 and 220, at 221, the secure key entry interface manager sets the active reference row to a bottom row (such as row *0 #) of the logically maintained keypad based on the non-dominant hand anchor touch 111A.

In an embodiment, at 222, the secure key entry interface manager sets the active reference row to a middle row (such as row 456) of the logically maintained keypad.

In an embodiment, at 223, the secure key entry interface manager sets the active reference row based on a configuration parameter or based on an identifier associated with the user for the transaction (such as through card information read by the transaction terminal).

At 230, the secure key entry interface manager navigates the logically maintained keypad from the active reference row and selects key entries corresponding to the logically maintained keypad based on second multi-touches detected on the surface of the touchscreen.

In an embodiment, at 231, the secure key entry interface manager changes the active reference row for the logically maintained keypad to a currently active row within the logically maintained keypad when a particular second multi-touch is swiped up or swiped down on the surface of the touchscreen.

In an embodiment of 231 and at 232, the secure key entry interface manager determines a changed characteristic in a portion of the particular second multi-touch and selects a particular key entry by mapping the changed characteristic to a particular key associated with the currently active row of the logically maintained keypad.

In an embodiment of 232 and at 233, the secure key entry interface manager identifies the changed characteristic as a change in pressure applied to the surface of the touchscreen at the portion relative to other portions of the particular second multi-touch or as a change in direction detected on the surface of the touchscreen at the portion relative to the other portions of the particular second multi-touch. This was described above with reference to FIGS. 1B and 1D.

In an embodiment of 231 and at 234, the secure key entry interface manager causes feedback in the form of abstract audio, or a vibration or a pulse on the surface of the touchscreen as a haptic feedback or both audible and haptic feedback when changing the active reference row to the currently active row.

In an embodiment, at 235, the secure key entry interface manager determines the key entry session is to be terminated based on: one or more third multi-touches, a total number of recorded key entries matches a predefined total number, or a detection of an elapsed period of time during which none of the second multi-touches are detected on the surface of the touchscreen.

At 240, the secure key entry interface manager provides the key entries as a result of the key entry session when the key entry session terminates.

In an embodiment, at 241, the secure key entry interface manager encrypts the key entries and provides encrypted key entries or an encrypted hash value for the key entries as the result of the key entry session.

Figure 3:
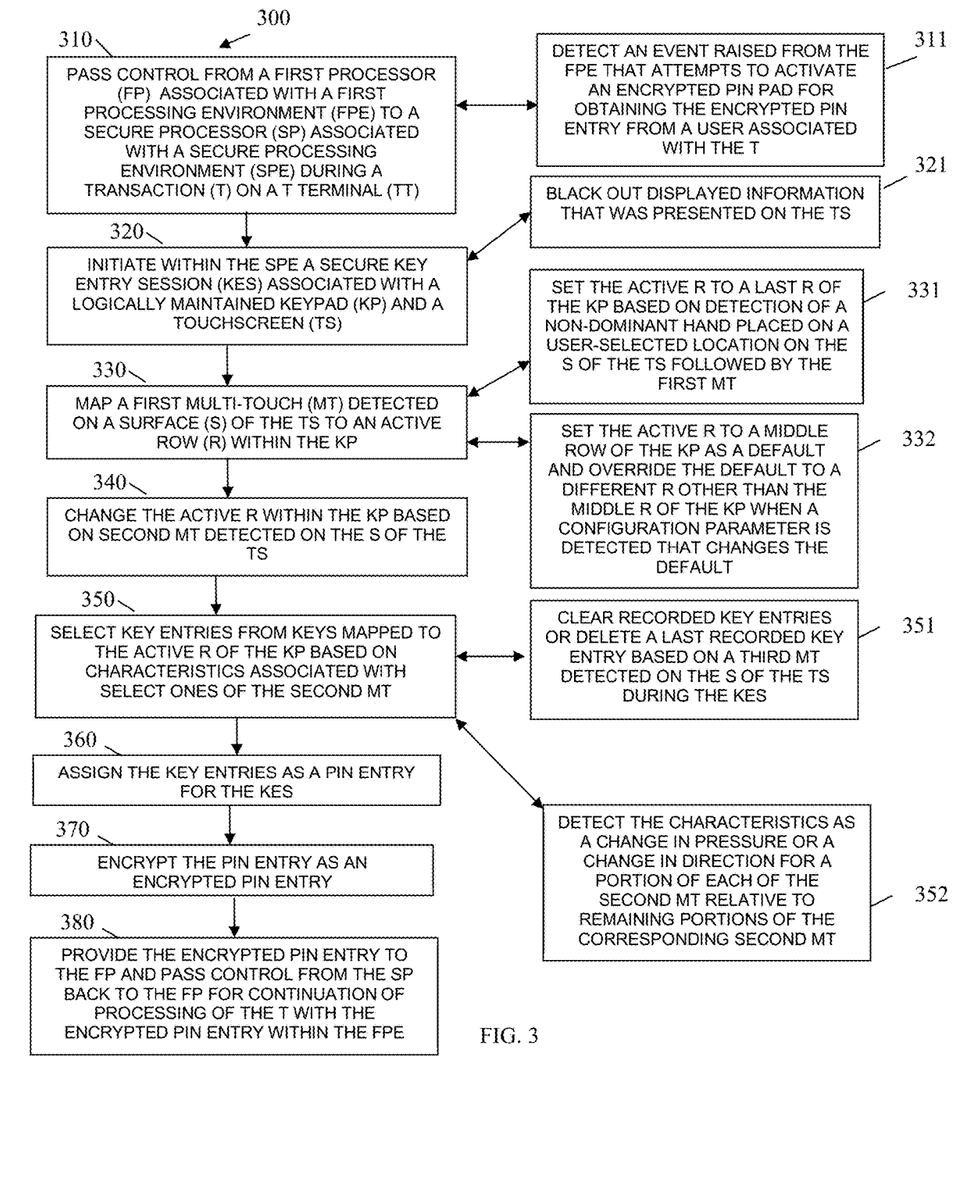
FIG. 3 is a diagram of another method for processing a multi-touch key entry interface, according to an example embodiment.

FIG. 3 is a diagram of another method 300 for processing a multi-touch key entry interface, according to an example embodiment. The software module(s) that implements the method 300 is referred to as a "multi-touch PIN entry manager." The multi-touch PIN entry manager is implemented as executable instructions programmed and residing within memory and/or a non-transitory computer-readable (processor-readable) storage medium and executed by one or more processors of a device. The processors that execute the multi-touch PIN entry manager are specifically configured and programmed to process the multi-touch PIN entry manager. The multi-touch PIN entry manager may have access to one or more network connections during its processing. The network connections can be wired, wireless, or a combination of wired and wireless.

In an embodiment, the device that executes the multi-touch PIN entry manager is the transaction terminal 110. In an embodiment, the transaction terminal 110 is one of: an SST, a POS terminal, an ATM, and/or a kiosk.

In an embodiment, the device that executes the multi-touch PIN entry manager is one of: a table, a phone, a laptop, a desktop, and a wearable processing device.

In an embodiment, the multi-touch PIN entry manager is all of some combination of display controller 112D, proprioceptive PIN translator 112F, encrypter 113D, display controller 113E, secure proprioceptive PIN translator 113F, and/or the method 200.

In an embodiment, the multi-touch PIN entry manager presents another, and in some ways, an enhanced processing perspective from that which was shown in the method 200 of the FIG. 2.

At 310, the multi-touch PIN entry manager passes control from a first processor associated with a first processing environment to a secure processor associated with a secure processing environment during a transaction being processed on a transaction terminal.

In an embodiment, at 311, the multi-touch PIN entry manager detects an event raised from the first processing environment that attempts to activate an encrypted PIN pad for obtaining an encrypted PIN entry from a user associated with the transaction.

At 320, the multi-touch PIN entry manager initiates within the secure processing environment a secure key entry session associated with a logically maintained keypad and a touchscreen of the transaction terminal.

In an embodiment, at 321, the multi-touch PIN entry manager blacks out displayed information that was presented on the touchscreen during the secure key entry session.

At 330, the multi-touch PIN entry manager maps a first multi-touch detected on a surface of the touchscreen to an active row within the logically maintained keypad.

In an embodiment, at 331, the multi-touch PIN entry manager sets the active row to a last row of the logically maintained keypad based on detection of a non-dominant hand placed on a user-selected location on the surface of the touchscreen followed by the first multi-touch.

In an embodiment, at 332, the multi-touch PIN entry manager sets the active row to a middle row of the logically maintained keypad as a default and overrides the default to a different row other than the middle row of the logically maintained keypad when a configuration parameter is detected that changes the default.

At 340, the multi-touch PIN entry manager changes the active row within the logically maintained keypad based on second multi-touches detected on the surface of the touchscreen.

At 350, the multi-touch PIN entry manager selects key entries from keys mapped to the active row of the logically maintained keypad based on characteristics associated with select ones of the second multi-touches.

In an embodiment, at 351, the multi-touch PIN entry manager clears recorded key entries or deletes a last recorded key entry based on a third multi-touch detected on the surface of the touchscreen.

In an embodiment, at 352, the multi-touch PIN entry manager detects the characteristics as a change in pressure or a change in direction for a portion of each of the select second multi-touches relative to remaining portion of the corresponding second multi-touches.

At 360, the multi-touch PIN entry manager assigns the key entries as a PIN entry for the secure key entry session.

At 370, the multi-touch PIN entry manager encrypts the PIN entry as an encrypted PIN entry.

At 380, the multi-touch PIN entry manager provides the encrypted PIN entry to the first processor and passes control from the secure processor back to the first processor for continuation of processing of the transaction with the encrypted PIN entry within the first processing environment.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
    identifying a first multi-touch on a surface of a touchscreen after initiation of a key entry session on a terminal;
    setting an active reference row that maps to a logically maintained keypad for the key entry session based on the identifying;
    navigating the logically maintained keypad from the active reference row and selecting key entries corresponding to the logically maintained keypad based on second multi-touches detected on the surface of the touchscreen; and
    providing the key entries as a result of the key entry session when the key entry session terminates.

2. The method of claim 1, wherein identifying further includes identifying a non-dominant hand anchor touch made on the surface of the touchscreen before identifying the first multi-touch.

3. The method of claim 2, wherein setting further includes setting the active reference row to a bottom row of the logically maintained keypad based on the non-dominant hand anchor touch.

4. The method of claim 1, wherein setting further includes setting the active reference row to a middle row of the logically maintained keypad.

5. The method of claim 1, wherein setting further includes setting the active reference row based on a configuration parameter.

6. The method of claim 1, wherein navigating further includes changing the active reference row for the logically maintained keypad to a currently active row within the logically maintained keypad when a particular second multi-touch is swiped up or swiped down on the surface of the touchscreen.

7. The method of claim 6, wherein selecting the key entries further includes determining a changed characteristic in a portion of the particular second multi-touch and selecting a particular key entry by mapping the changed characteristic to a particular key associated with the currently active row of the logically maintained keypad.

8. The method of claim 7, wherein determining further includes identifying the changed characteristic as a change in pressure applied to the surface of the touchscreen at the portion relative to other portions of the particular second multi-touch or as a change in direction detected on the surface of the touchscreen at the portion relative to the other portions of the particular second multi-touch.

9. The method of claim 6, wherein changing the active reference row further includes causing a vibration or a pulse on the surface of the touchscreen as a haptic feedback when changing the active reference row to the currently active row.

10. The method of claim 1, wherein navigating and selecting further includes determining that the key entry session is to be terminated based on one or more third multi-touches, a total-number of the key entries matches a predefined total-number, or a detection of an elapsed period of time during which none of the second multi-touches are detected on the surface of the touchscreen.

11. The method of claim 10, wherein providing further includes encrypting the key entries and providing encrypted key entries as the result.

12. A method, comprising:
    passing control from a first processor associated with a first processing environment to a secure processor associated with a secure processing environment during a transaction on a transaction terminal;
    initiating within the secure processing environment a secure key entry session associated with a logically maintained keypad and a touchscreen;
    mapping a first multi-touch detected on a surface of the touchscreen to an active row within the logically maintained keypad;
    changing the active row within the logically maintained keypad based on second multi-touches detected on the surface of the touchscreen;
    selecting key entries from keys mapped to the active row of the logically maintained keypad based on characteristics associated with select ones of the second multi-touches;
    assigning the key entries as a Personal Identification Number (PIN) entry for the key entry session;
    encrypting the PIN entry as an encrypted PIN entry;
    providing the encrypted PIN entry to the first processor and passing control from the secure processor back to the first processor for continuation of processing associated with the transaction with the encrypted PIN value within the first processing environment.

13. The method of claim 12, wherein passing further includes detecting an event raised from the first processing environment that attempts to activate an encrypted PIN pad for obtaining the encrypted PIN entry from a user associated with the transaction.

14. The method of claim 12, wherein initiating further includes blacking out displayed information that was presented on the touchscreen.

15. The method of claim 12, wherein mapping further includes setting the active row to a last row of the logically maintained keypad based on detection of a non-dominant hand placed on a user-selected location on the surface of the touchscreen followed by the first multi-touch.

16. The method of claim 12, wherein mapping further includes setting the active row to a middle row of the logically maintained keypad as a default and overriding the default to a different row other than the middle row of the logically maintained keypad when a configuration parameter is detected that changes the default.

17. The method of claim 12, wherein selecting further includes clearing recorded key entries or deleting a last record key entry based on a third multi-touch detected on the surface of the touchscreen during the key entry session.

18. The method of claim 17, wherein selecting further includes detecting the characteristics as a change in pressure or a change in direction for a portion of each of the select ones of the second multi-touches relative to remaining portions of the corresponding second multi-touches.

19. A terminal, comprising:
a touchscreen;
a processor;
a non-transitory computer-readable storage medium or memory having executable instructions;
a secure processor;
a secure non-transitory computer-readable storage medium or secure memory having secure executable instructions;
the executable instructions when executed from the non-transitory computer-readable storage medium or the memory by the processor configured to perform first operations comprising:
passing control to the touchscreen to the secure processor based on an event associated with a request to obtain a Personal Identification Number (PIN) from during a transaction on the terminal;
receiving an encrypted PIN entry that was obtained by the secure executable instructions of the secure processor when control of the touchscreen was with the secure processor;
obtaining control of the touchscreen from the secure processor after receipt of the encrypted PIN entry; and
processing the transaction with the encrypted PIN entry; and
the secure executable instructions when executed from the secure non-transitory computer-readable storage medium or the secure memory by the secure processor configured to perform second operations comprising:
obtaining control of the touchscreen from the first processor during the transaction;
mapping a first multi-touch detected on a surface of the touchscreen to an active row of a logically maintained keypad;
changing the active row based on second multi-touches detected on the surface of the touchscreen;
selecting key entries for keys of the logically maintained keypad from the active row based on characteristics of the second multi-touches;
determining that a PIN entry is completed;
encrypting the PIN entry as the encrypted PIN entry;
providing the encrypted PIN entry to the first processor; and
passing control of the touchscreen back to the first processor.

20. The terminal of claim 19, wherein the terminal is one of: a Self-Service Terminal, A Point-Of-Sale (POS) terminal, an Automated Teller Machine (ATM), and a kiosk.

* * * * *